US010277661B2

(12) United States Patent
Maruyama

(10) Patent No.: US 10,277,661 B2
(45) Date of Patent: Apr. 30, 2019

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Atsushi Maruyama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 35 days.

(21) Appl. No.: 15/013,451

(22) Filed: Feb. 2, 2016

(65) Prior Publication Data

US 2017/0060815 A1 Mar. 2, 2017

(30) Foreign Application Priority Data

Aug. 24, 2015 (JP) ................................. 2015-164818

(51) Int. Cl.
*G06F 17/00* (2006.01)
*H04L 29/08* (2006.01)
*G06F 3/0482* (2013.01)
*G06F 17/24* (2006.01)
*G06F 17/21* (2006.01)

(52) U.S. Cl.
CPC ............ *H04L 67/06* (2013.01); *G06F 3/0482* (2013.01); *G06F 17/212* (2013.01); *G06F 17/24* (2013.01)

(58) Field of Classification Search
CPC ........ G06F 17/30082; G06F 17/30309; G06Q 10/06; G06Q 10/103
See application file for complete search history.

(56) References Cited

U.S. PATENT DOCUMENTS 7,103,853 B1 * 9/2006 Patil ...................... G06F 3/0481
715/744
7,788,578 B1 * 8/2010 Poozhiyil ................ G06F 17/24
715/243

(Continued)

FOREIGN PATENT DOCUMENTS

JP 2007-179228 A 7/2007
JP 2009-129004 A 6/2009

(Continued)

OTHER PUBLICATIONS

Feb. 20, 2019 Office Action issued on Japanese Patent Application No. 2015-164818.

*Primary Examiner* — Andrew T McIntosh
(74) *Attorney, Agent, or Firm* — Oliff PLC

(57) ABSTRACT

An information processing apparatus includes a memory, a display controller, a specification receiving unit, and a processing execution unit. The memory stores document data and a group of processing functions, and associates the document data with the group of processing functions, the group of processing functions being constituted by multiple processing functions indicating respective processes to be performed on the document data. The display controller performs control such that in a case where the document data is specified by a user, the group of processing functions associated with the specified document data and stored in the memory is displayed. The specification receiving unit receives specification of the processing functions of the displayed group of processing functions. The processing execution unit executes a process corresponding to a processing function received by the specification receiving unit.

15 Claims, 19 Drawing Sheets

(56) References Cited

U.S. PATENT DOCUMENTS

2014/0006516 A1* 1/2014 Nivala ............... G06F 9/52
  709/205
2014/0019848 A1* 1/2014 Le Bescond de Coatpont ............
  G06F 17/24
  715/234
2015/0193706 A1* 7/2015 Iwasaki ............... G06Q 10/06
  705/7.27

FOREIGN PATENT DOCUMENTS

| | | |
|---|---|---|
| JP | 2011-217322 A | 10/2011 |
| JP | 2012-088981 A | 5/2012 |

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-164818 filed Aug. 24, 2015.

BACKGROUND

Technical Field

The present invention relates to an information processing apparatus, and a non-transitory computer readable medium.

SUMMARY

According to an aspect of the invention, there is provided an information processing apparatus including a memory, a display controller, a specification receiving unit, and a processing execution unit. The memory stores document data and a group of processing functions, and associates the document data with the group of processing functions, the group of processing functions being constituted by multiple processing functions indicating respective processes to be performed on the document data. The display controller performs control such that in a case where the document data is specified by a user, the group of processing functions associated with the specified document data and stored in the memory is displayed. The specification receiving unit receives specification of the processing functions of the displayed group of processing functions. The processing execution unit executes a process corresponding to a processing function received by the specification receiving unit.

BRIEF DESCRIPTION OF THE DRAWINGS

An exemplary embodiment of the present invention will be described in detail based on the following figures, wherein.

DETAILED DESCRIPTION

Next, an exemplary embodiment of the present invention will be described in detail with reference to the drawings.

Figure 1:
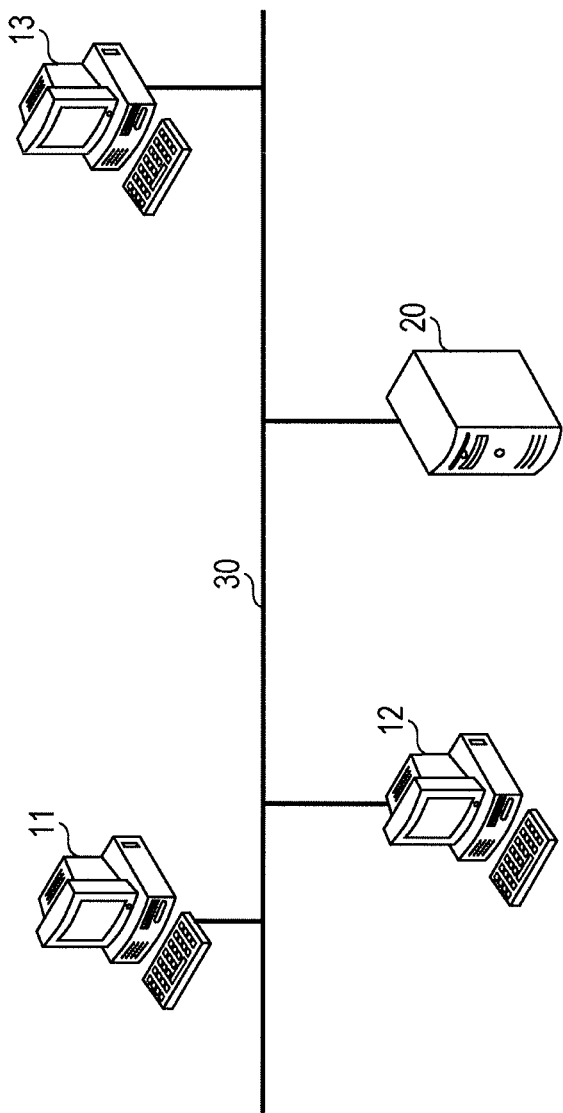
FIG. 1 is a diagram illustrating the configuration of a document management system according to an exemplary embodiment of the present invention.

FIG. 1 is a diagram illustrating a system configuration of a document management system according to an exemplary embodiment of the present invention.

The document management system according to the exemplary embodiment of the present invention includes, as illustrated in FIG. 1, information processing apparatuses 11 to 13 and a server apparatus 20, which are connected to each other via a network 30. Examples of the information processing apparatuses 11 to 13 are personal computers.

A document editor is installed in the information processing apparatuses 11 to 13, and this document editor makes it possible to edit and generate document data.

In addition, since the document editors installed in the respective information processing apparatuses 11 to 13 are substantially the same, generated document data may be transmitted and received to and from each other, and viewing and modifying of the generated document data are also possible.

In addition, since the server apparatus 20 is connected to the information processing apparatuses 11 to 13 via the network 30, the server apparatus 20 may store data generated by the information processing apparatuses 11 to 13. The information processing apparatuses 11 to 13 are configured to be able to read out data stored in the server apparatus 20. The information processing apparatuses 11 to 13 are thus able to transmit and receive data to and from each other via the server apparatus 20.

Figure 2:
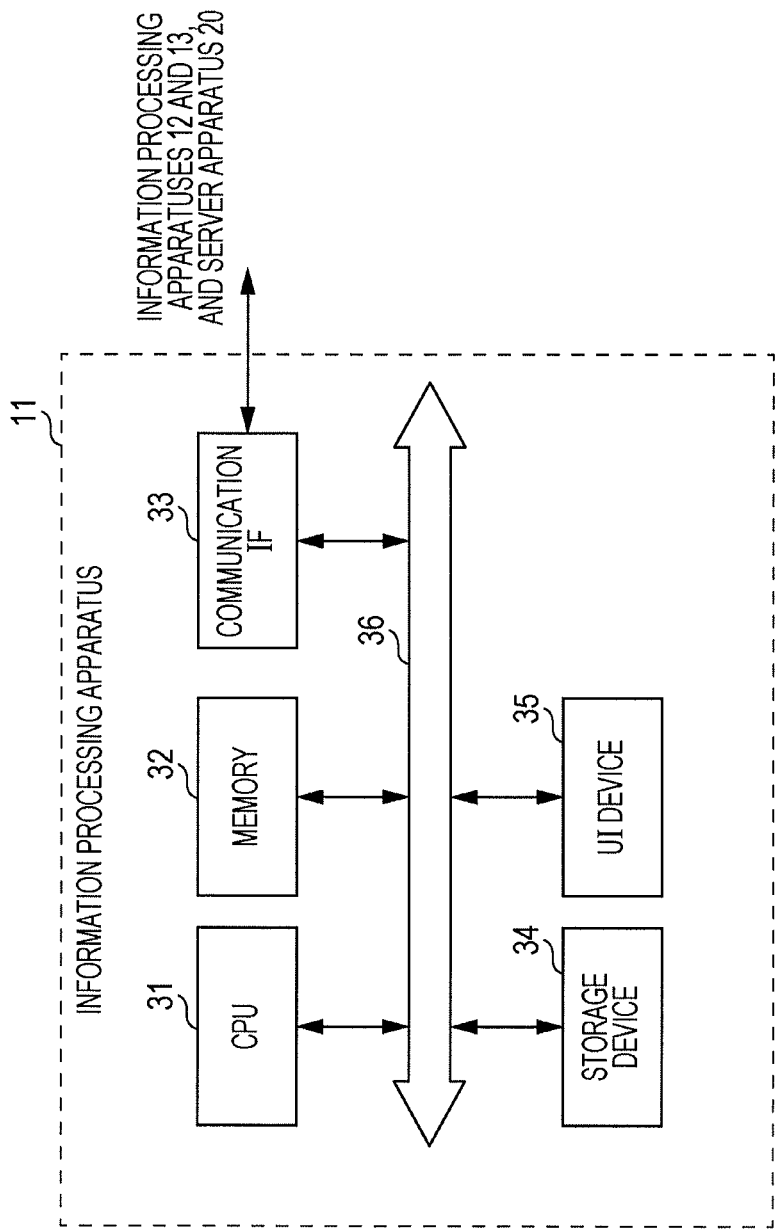
FIG. 2 is a block diagram illustrating a hardware configuration of an information processing apparatus according to the exemplary embodiment of the present invention.

Next, FIG. 2 illustrates a hardware configuration of the information processing apparatus 11 in the document management system according to the present exemplary embodiment. Note that each of the information processing apparatuses 12 and 13 has the same configuration as the information processing apparatus 11, and thus description thereof will be omitted.

The information processing apparatus 11 includes, as illustrated in FIG. 2, a central processing unit (CPU) 31, a memory 32, a communication interface (IF) 33, a storage device 34, and a user interface (UI) device 35. The communication IF 33 transmits and receives data to and from for example an external apparatus via the network 30. An example of the storage device 34 is a hard disk drive (HDD). The user UI device 35 includes a touch panel or a liquid crystal display, and a keyboard. These elements are connected to each other via a control bus 36.

The CPU 31 executes certain processes in accordance with a control program stored in the memory 32 or the storage device 34, and controls an operation of the information processing apparatus 11. Note that it has been described in the present exemplary embodiment that the CPU 31 reads out and executes the control program stored in the memory 32 or the storage device 34; however, it is also possible to supply the control program to the CPU 31 using a storage medium such as a CD-ROM in which the control program is stored.

Figure 3:
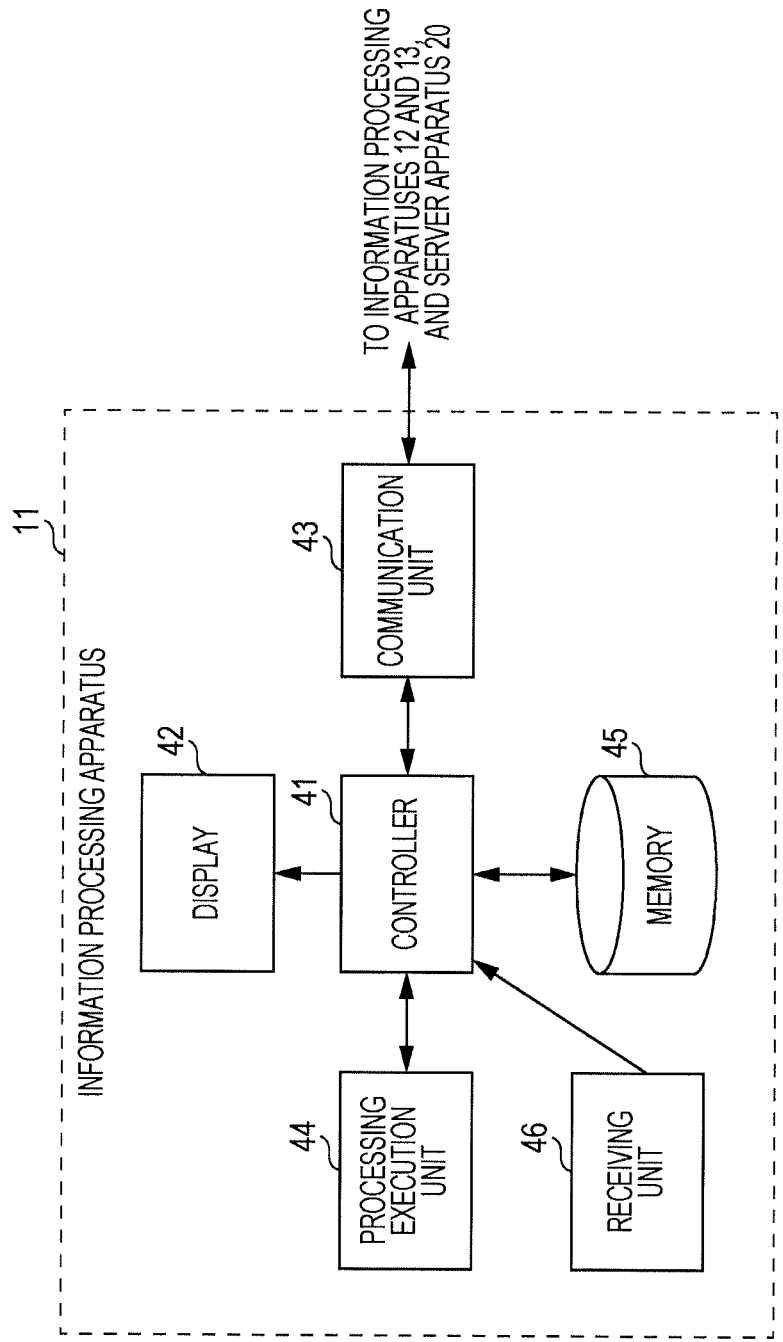
FIG. 3 is a block diagram illustrating a functional configuration of the information processing apparatus according to the exemplary embodiment of the present invention.

FIG. 3 is a block diagram illustrating a functional configuration of the information processing apparatus 11 realized by execution of the above-described control program.

The information processing apparatus 11 of the present exemplary embodiment includes, as illustrated in FIG. 3, a controller 41, a display 42, a communication unit 43, a processing execution unit 44, a memory 45, and a receiving unit 46.

The memory 45 stores document data and a group of tools (a group of processing functions) so that the document data is associated with the group of tools. The group of tools is constituted by multiple tools (processing functions) indicating respective processes to be performed on the document data. In addition, information regarding the group of tools stored in the memory 45 includes order information regarding the order in which the multiple tools are to be executed.

In a case where certain document data is specified by a user, the controller 41 performs control such that the group of tools associated with the specified document data and stored in the memory 45 is displayed on the display 42. Here, the controller 41 displays on the display 42 the group of tool, which is stored in the memory 45, so that the tools included in the group of tools are individually selectable.

In a case where a change regarding tools to be included in the group of tools is received by the receiving unit 46, the controller 41 updates the group of tools, which is stored in the memory 45.

In addition, the controller 41 generates a task object (service data) by performing formatting by adding, to the document data, information regarding the group of tools associated with the document data as attribute information.

In a case where task-object transmission is commanded by a user, the controller 41 transmits the generated task object to for example the other information processing apparatuses 12 and 13 via the communication unit 43. For example, the task object is transmitted to other image processing apparatuses by being attached to an e-mail, by being stored in an in-tray of a recipient to whom transmission of the task object is desired, or by performing data exchange via for example a shared server apparatus.

In addition, the controller 41 is able to receive task objects transmitted from for example the other information processing apparatuses 12 and 13 via the communication unit 43.

In a case where the controller 41 has received a task object from for example the information processing apparatus 12 or 13, the controller 41 performs control such that the memory 45 is caused to store document data and information regarding a group of tools included in the received task object. The memory 45 stores document data and information regarding a group of tools included in a task object received by the controller 41.

In addition, the controller 41 transfers to a memory of the server apparatus 20 a task object in which document data is associated with a group of tools. The server apparatus 20 is an external apparatus to which the other information processing apparatuses 12 and 13 are able to access.

In a case where certain document data is specified by a user, the controller 41 acquires from the memory of the server apparatus 20 information regarding a group of tools associated with the specified document data. Then, the controller 41 performs control such that the acquired information regarding the group of tools is displayed on the display 42.

Note that in a case where an expanded task object is closed, the controller 41 deletes information regarding a group of tools expanded together with document data so that the information regarding the group of tools is not left in the information processing apparatus 11.

The display 42 displays document data and information regarding a group of tools in accordance with control performed by the controller 41.

The communication unit 43 communicates with for example the information processing apparatuses 12 and 13 and the server apparatus 20 in accordance with control performed by the controller 41, acquires information regarding a certain group of tools by accessing the server apparatus 20, and transmits and receives a certain task object to and from the information processing apparatuses 12 and 13.

The receiving unit 46 receives, for each of the tools of a certain group of tools displayed on the display 42, specification of the tool in accordance with an operation performed by a user. In addition, the receiving unit 46 receives a change regarding tools to be included in the group of tools.

The processing execution unit 44 executes on the document data a process corresponding to a certain tool received by the receiving unit 46.

Next, an operation of the document management system according to the present exemplary embodiment will be described in detail with reference to the drawings.

Figure 4:
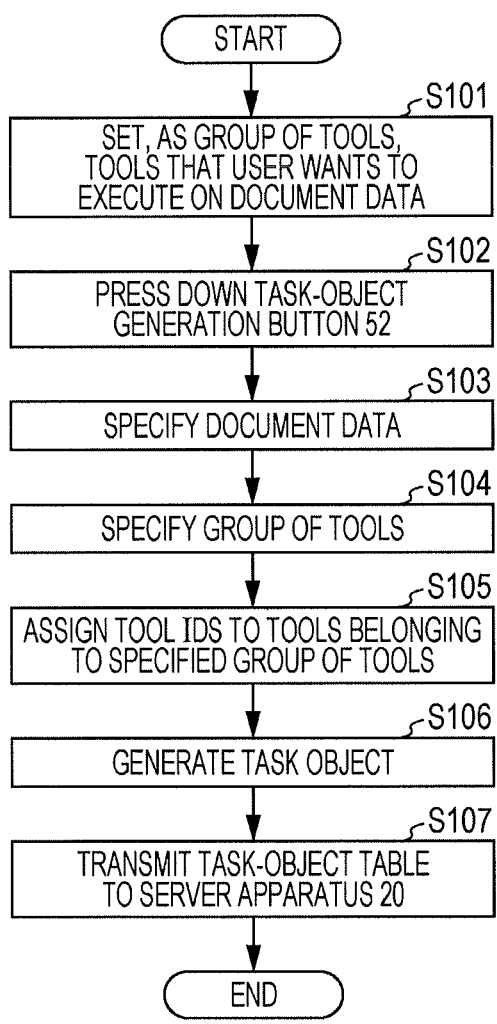
FIG. 4 is a flowchart illustrating an operation performed by the information processing apparatus according to the exemplary embodiment of the present invention when a task object is generated.

First, with reference to the flowchart of FIG. 4, an operation performed by the information processing apparatus 11 of the present exemplary embodiment when a certain task object is generated will be described. For this description, FIG. 5 illustrates an example of a display screen displayed when a task object is generated.

Figure 5:
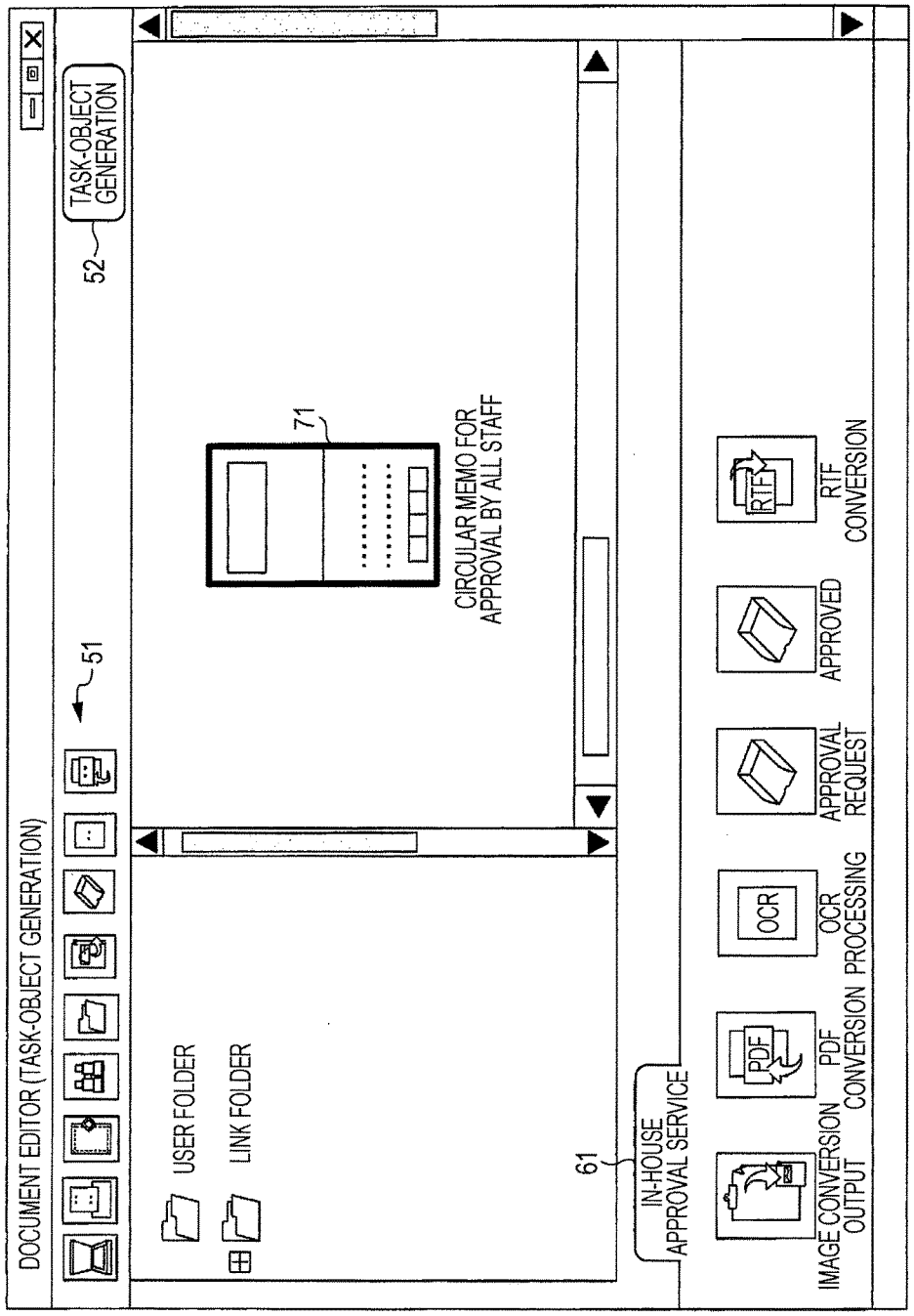
FIG. 5 is a diagram illustrating an example of a display screen displayed when a task object is generated.

In the example of the display screen illustrated in FIG. 5, document data whose name is "circular memo for approval by all staff" is illustrated as document data for which a task object is to be generated. In addition, functions that may be executed on the document data are displayed as tools on a toolbar 51 in this example of the display screen.

In a case where a task object is to be generated, a user presets, as a group of tools, tools that the user wants to execute on the document data (step S101).

The example of the display screen illustrated in FIG. 5 illustrates a case where a group of tools 61 called "in-house approval service" is set. In FIG. 5, tools such as "image conversion output", "PDF conversion", "OCR processing", "approval request", "approved", and "rich text file (RTF) conversion" are set as the group of tools 61. Note that an execution order is set for this group of tools 61 such that the tools arranged in the group of tools 61 are to be executed in order from left to right.

While the group of tools 61 is being set, the user presses down a task-object generation button 52 (step S102), and specifies certain document data for which the user wants to generate a task object (step S103).

It is clear in the example of the display screen of FIG. 5 that document data 71 for "circular memo for approval by all staff" is specified and thus the displayed outer frame of an image represented by the document data 71 has been changed to a bold outer frame.

While the document data 71 is being specified, the user specifies from among multiple preset groups of tools a group of tools that the user wants to include in a task object (step S104). Here, suppose that the group of tools 61 called "in-house approval service", which has been generated in advance, is specified.

Then, the controller 41 assigns tool IDs (identifiers) to the tools belonging to the specified group of tools 61 (step S105), and generates for the document data 71 a task object by including information regarding this group of tools 61 as attribute information (step S106).

Note that when this task object is generated, a document ID is assigned to the document data 71, and the task object is managed using this document ID.

Figure 6:
FIG. 6 is a diagram illustrating an example of a task-object table for managing the configuration of a generated task object.

FIG. 6 illustrates an example of a task-object table for managing the configuration of a task object generated in this manner.

In this example illustrated in FIG. 6, a document ID of "100012564" is assigned to the document data for "circular memo for approval by all staff". It is clear that this document ID, a tool-group ID of "123456", and information regarding for example the update date and time of information regarding a group of tools are associated with each other and stored. Tool IDs for specifying multiple tools included in this group of tools are associated with this tool-group ID and are stored.

In the example of the task-object table of FIG. 6, for example, a tool ID of "40023533" indicates a tool called "image conversion output". In addition, a tool ID of "40012564" indicates a tool called "PDF conversion".

The controller 41 transmits data of a task-object table as illustrated in FIG. 6 to the server apparatus 20 via the communication unit 43 (step S107). The server apparatus 20 stores and manages the task-object table transmitted by the controller 41.

Figure 7:
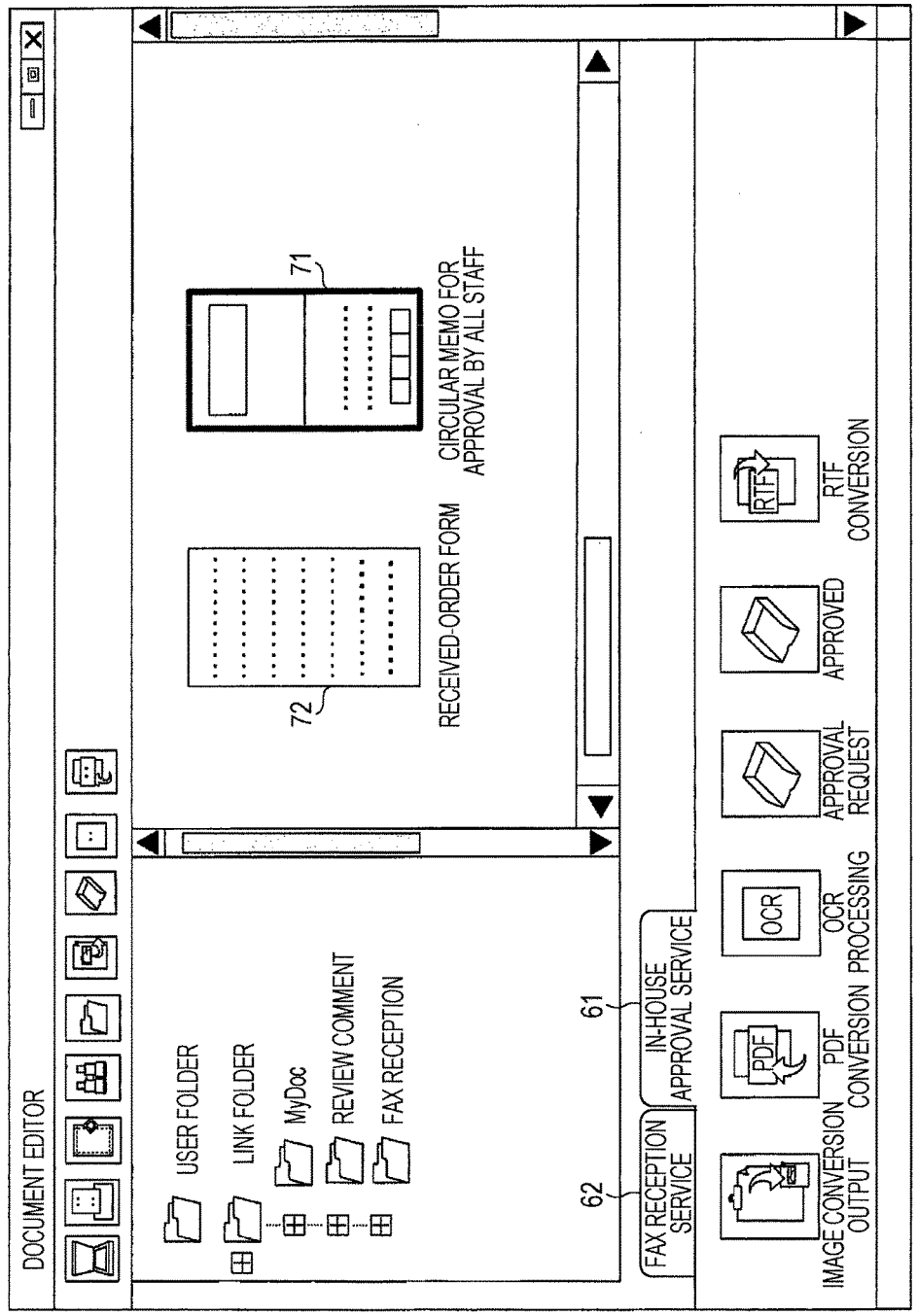
FIG. 7 is a diagram illustrating an example of a screen displayed in a case where two generated task objects are displayed on a display.
Figure 8:
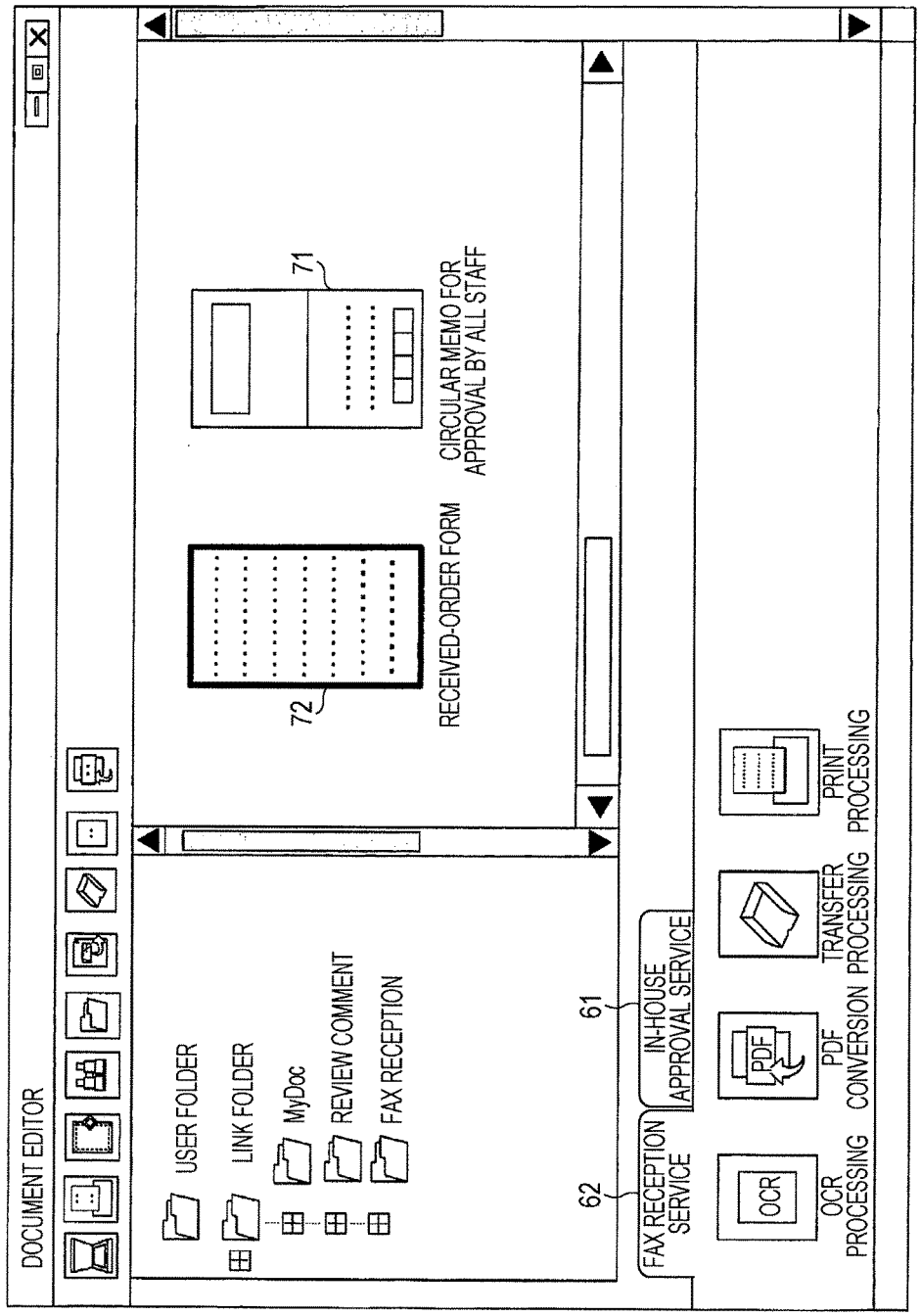
FIG. 8 is a diagram illustrating an example of a screen displayed in the case where the two generated task objects are displayed on the display.

Next, FIGS. 7 and 8 illustrate examples of a screen displayed when two task objects generated in this manner are displayed on the display 42.

Note that FIGS. 7 and 8 illustrate a case where two task objects are opened, the two task objects being a task object in which the document data 71 whose name is "circular memo for approval by all staff" is associated with the group of tools 61 whose name is "in-house approval service", and a task object in which document data 72 whose name is "received-order form" is associated with a group of tools 62 whose name is "FAX reception service". Then, the controller 41 displays the groups of tools 61 and 62 associated with the respective pieces of document data in a tab format. The group of tools to be displayed is switched between the groups of tools 61 and 62 every time tab switching is performed.

Even in the case where multiple task objects are simultaneously opened, since in each task object document data and a group of tools are associated with each other and are set for the task object, selection of document data causes the group of tools associated with the document data to be displayed.

Specifically, in FIG. 7, since the document data 71 whose name is "circular memo for approval by all staff" is selected, the group of tools 61 called "in-house approval service" and associated with the document data 71 for this "circular memo for approval by all staff" is displayed.

In addition, in FIG. 8, since the document data 72 whose name is "received-order form" is selected, the group of tools 62 called "FAX reception service" and associated with the document data 72 for this "received-order form" is displayed.

As is clear from FIGS. 7 and 8, when certain document data is selected to execute processing, tab switching is performed such that the group of tools associated with the selected document data is displayed.

In particular, even in the case where a certain task object including document data and a group of tools constituted by multiple tools to be executed on the document data is received from another information processing apparatus, not only the document data but also the group of tools associated with the document data are automatically displayed by simply opening the task object.

Figure 9:
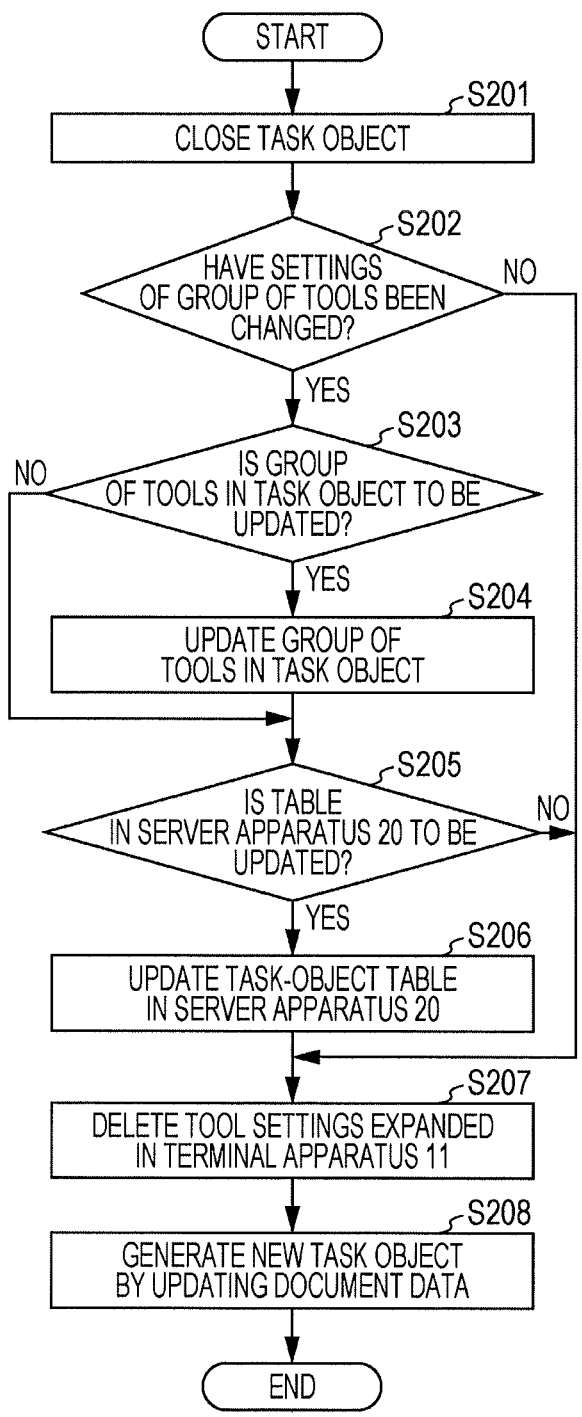
FIG. 9 is a flowchart for describing an operation performed when a generated task object is closed.

Next, an operation performed when a task object generated in this manner is closed will be described with reference to the flowchart of FIG. 9.

In a case where a command such as closing of an expanded task object is issued (step S201), the controller 41 first determines whether or not settings of the group of tools have been changed (step S202).

In the case where the settings of the group of tools have not been changed (no in step S202), the controller 41 deletes tool settings expanded in the terminal apparatus 11 (step S207), and generates a new task object by updating the document data (step S208).

In the case where it is determined in step S202 that the settings of the group of tools have been changed, the controller 41 makes an inquiry to a user as to whether or not to update the group of tools in the task object (step S203).

In the case where the user has approved update of the group of tools (yes in step S203), the controller 41 updates information regarding the group of tools in the task object (step S204). Here, the update of the group of tools includes deletion of tools from, addition of tools to, and changing of tools in the group of tools.

Then, the controller 41 also makes an inquiry to the user as to whether or not to update the task-object table in the server apparatus 20 (step S205).

In the case where the user has approved update of the task-object table in the server apparatus 20 (yes in step S205), the controller 41 executes processing for updating the task-object table in the server apparatus 20 (step S206).

Then, as described above, the controller 41 deletes the tool settings expanded in the terminal apparatus 11 (step S207), and generates a new task object by updating the document data (step S208).

Figure 10:
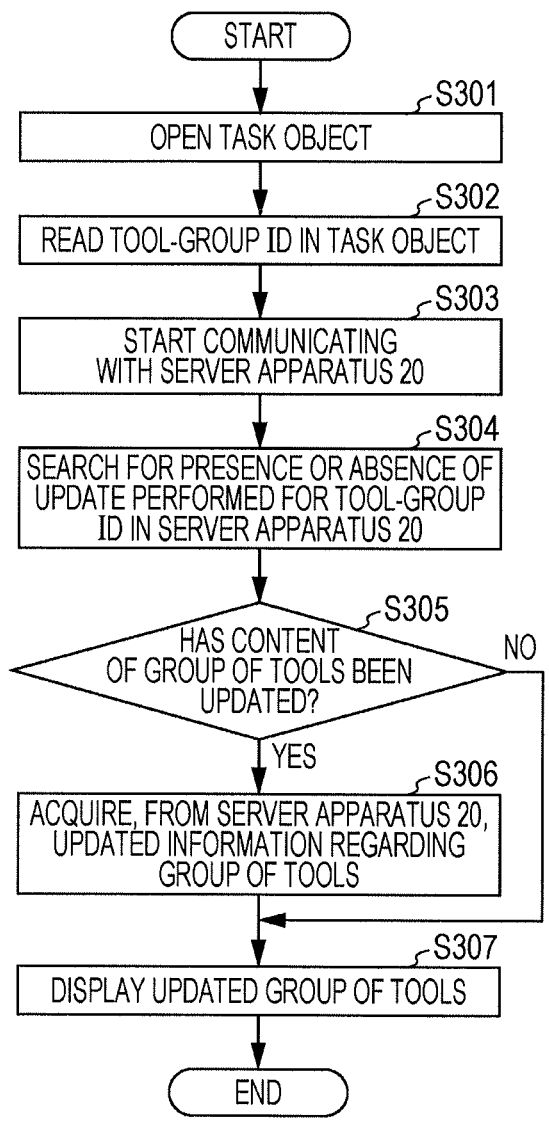
FIG. 10 is a flowchart for describing an operation performed when a task object that has once been closed is opened.

Next, an operation performed when a certain task object that has once been closed is opened will be described with reference to the flowchart of FIG. 10.

In a case where a certain task object generated as described above is opened by the terminal apparatus 11, or where an operation for opening a task object received from another information processing apparatus is performed (step S301), the controller 41 reads information regarding the group of tools in the task object (step S302).

The controller 41 starts communicating with the server apparatus 20 via the communication unit 43 and accesses the server apparatus 20 (step S303).

The controller 41 searches for the presence or absence of update performed for the tool-group ID read from the task object to which a file opening command has been issued (step S304). Specifically, the update date and time of the group of tools in the opened task object is compared with the update date and time of the group of tools in the task-object table stored in the server apparatus 20. In the case where the update date and time of the group of tools in the task-object table stored in the server apparatus 20 is later, it is determined that some kind of change has been made to information regarding the group of tools.

In the case where it is determined that the information regarding the group of tools in the opened task object has been updated (yes in step S305), the controller 41 downloads and acquires from the server apparatus 20 the updated information regarding the group of tools (step S306).

Figure 11:
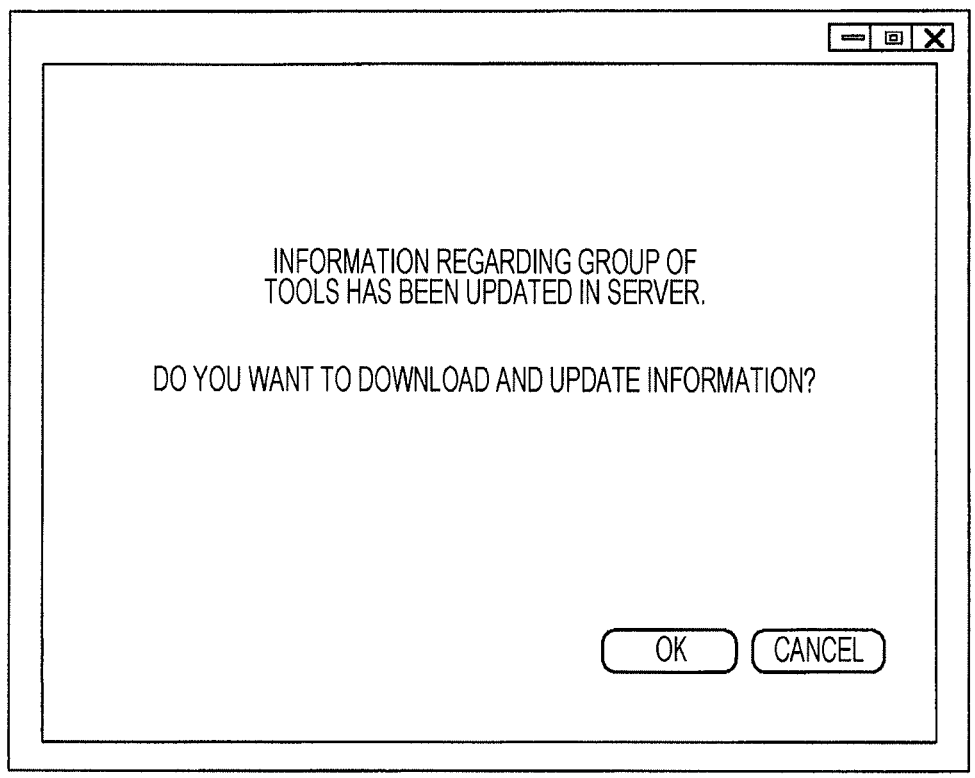
FIG. 11 is a diagram illustrating an example of a display screen displayed when a user is caused to confirm whether or not to update information regarding a group of tools.

Note that when the latest information regarding the group of tools is downloaded from the server apparatus 20, the controller 41 causes a user to confirm whether or not to update the information regarding the group of tools using a display screen as illustrated in FIG. 11. Only in the case where the user has approved update of the information regarding the group of tools, the latest information regarding the group of tools may be downloaded.

Then, the controller 41 causes the display 42 to display the group of tools of the tool-group ID read from the task object (step S307).

Next, with reference to FIGS. 12 to 15, an operation performed in a case where information regarding a group of tools stored in the server apparatus 20 is updated will be described using specific examples.

Figure 12:
FIG. 12 is a diagram illustrating an example of an updated task-object table stored in a server apparatus.

For example, the case will be described where a task-object table stored in the terminal apparatus 11 has content as illustrated in FIG. 6 and a task-object table stored in the server apparatus 20 has content as illustrated in FIG. 12.

When FIG. 6 is compared with FIG. 12, it is clear in the task-object table illustrated in FIG. 12 that a tool called "RTF conversion" having a tool ID of "40012588" is deleted from the group of tools having a tool-group ID of "123456".

The controller 41 compares the update date and time of information regarding the group of tools of the terminal apparatus 11 (04/12/2015 06:59) with the update date and time (07/16/2015 08:14) of information regarding the group of tools included in the task-object table stored in the server apparatus 20. The controller 41 determines that since the update date and time of the information regarding the certain group of tools stored in the server apparatus 20 is later, the group of tools has been updated in some way.

Figure 13:
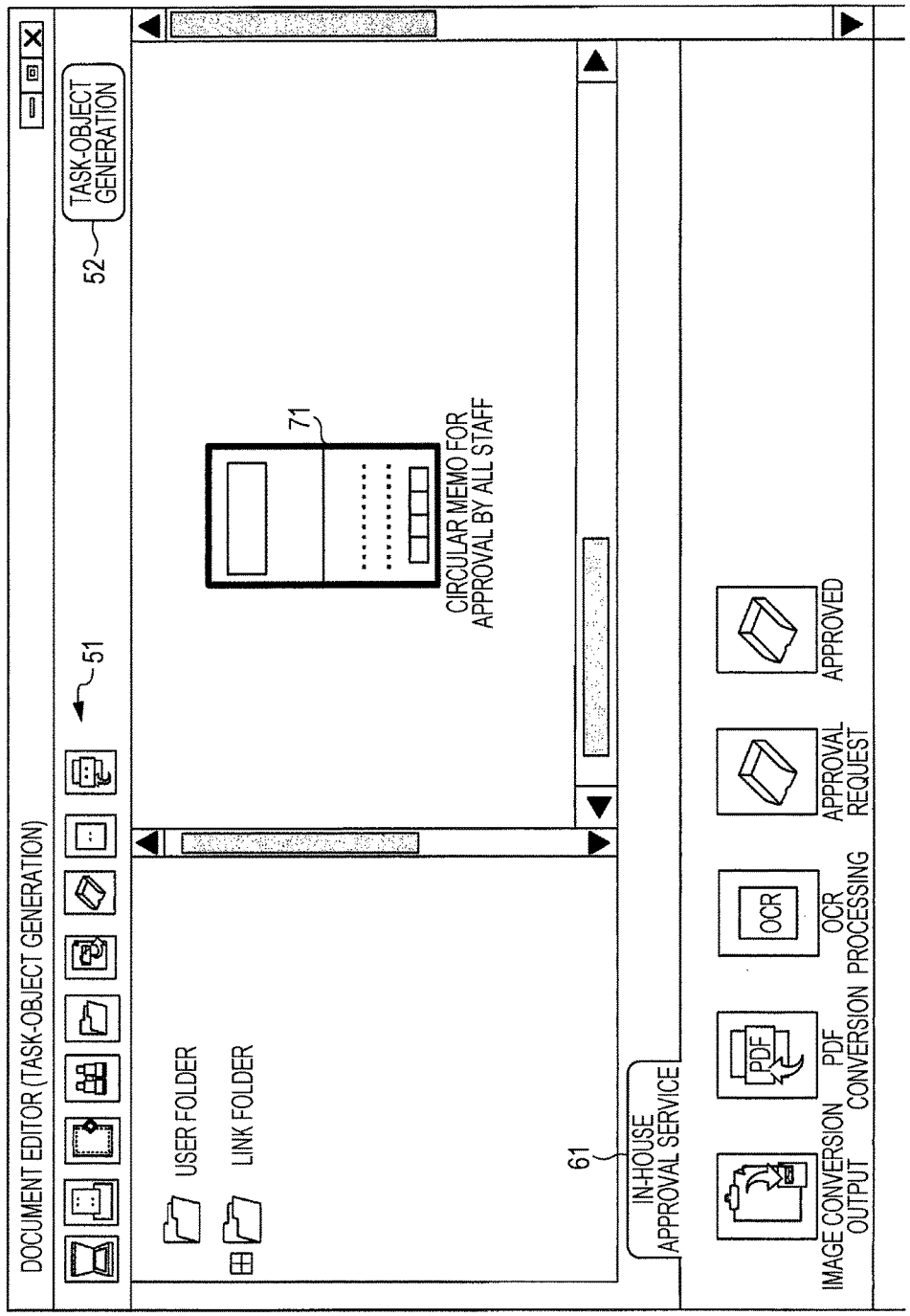
FIG. 13 is a diagram illustrating an example of a display screen displayed in a case where update is performed in accordance with information regarding a group of tools based on the task-object table illustrated in FIG. 12.

The controller 41 thus updates the content of an opened task object in accordance with the information regarding the group of tools stored in the server apparatus 20, and displays a group of tools as illustrated in FIG. 13. It is clear in the example of a display screen illustrated in FIG. 13 that the tool "RTF conversion" is deleted.

Figure 14:
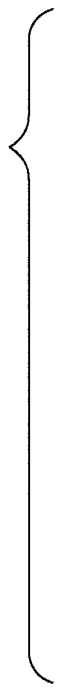
FIG. 14 is a diagram illustrating another example of an updated task-object table stored in the server apparatus.

In addition, for example, the case will be described where a task-object table stored in the terminal apparatus 11 has content as illustrated in FIG. 6 and a task-object table stored in the server apparatus 20 has content as illustrated in FIG. 14.

As is clear from a comparison made between FIG. 6 and FIG. 14, the tool "RTF conversion" is changed to a tool called "print" having a tool ID of "40041023" in the group of tools obtained after the update.

The controller 41 compares the update date and time of information regarding the group of tools of the terminal apparatus 11 (04/12/2015 06:59) with the update date and time (08/15/2015 11:24) of information regarding the group of tools included in the task-object table stored in the server apparatus 20. The controller 41 determines that since the update date and time of the information regarding the certain group of tools stored in the server apparatus 20 is later, the group of tools has been updated in some way.

Figure 15:
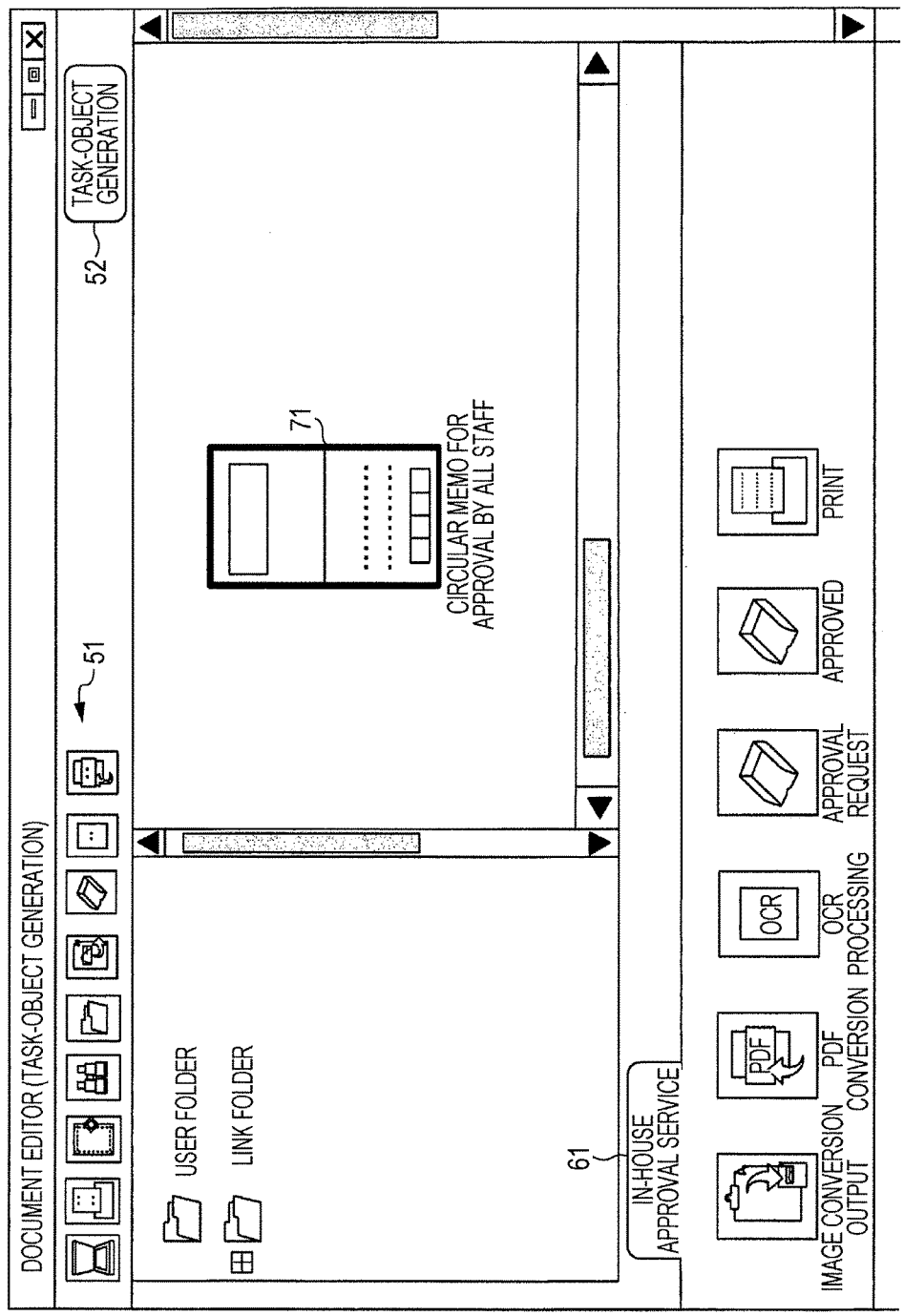
FIG. 15 is a diagram illustrating an example of a display screen displayed in a case where update is performed in accordance with information regarding a group of tools based on the task-object table illustrated in FIG. 14.

The controller 41 thus updates the content of an opened task object in accordance with the information regarding the group of tools stored in the server apparatus 20, and displays a group of tools as illustrated in FIG. 15.

As is clear from a comparison made between FIG. 15 and FIG. 7, the tool called "RTF conversion" is changed to the tool called "print" in the group of tools obtained after the update.

Next, cases where transmission and reception of a generated task object is performed among multiple users will be specifically described with reference to FIGS. 16 to 19.

Figure 16:
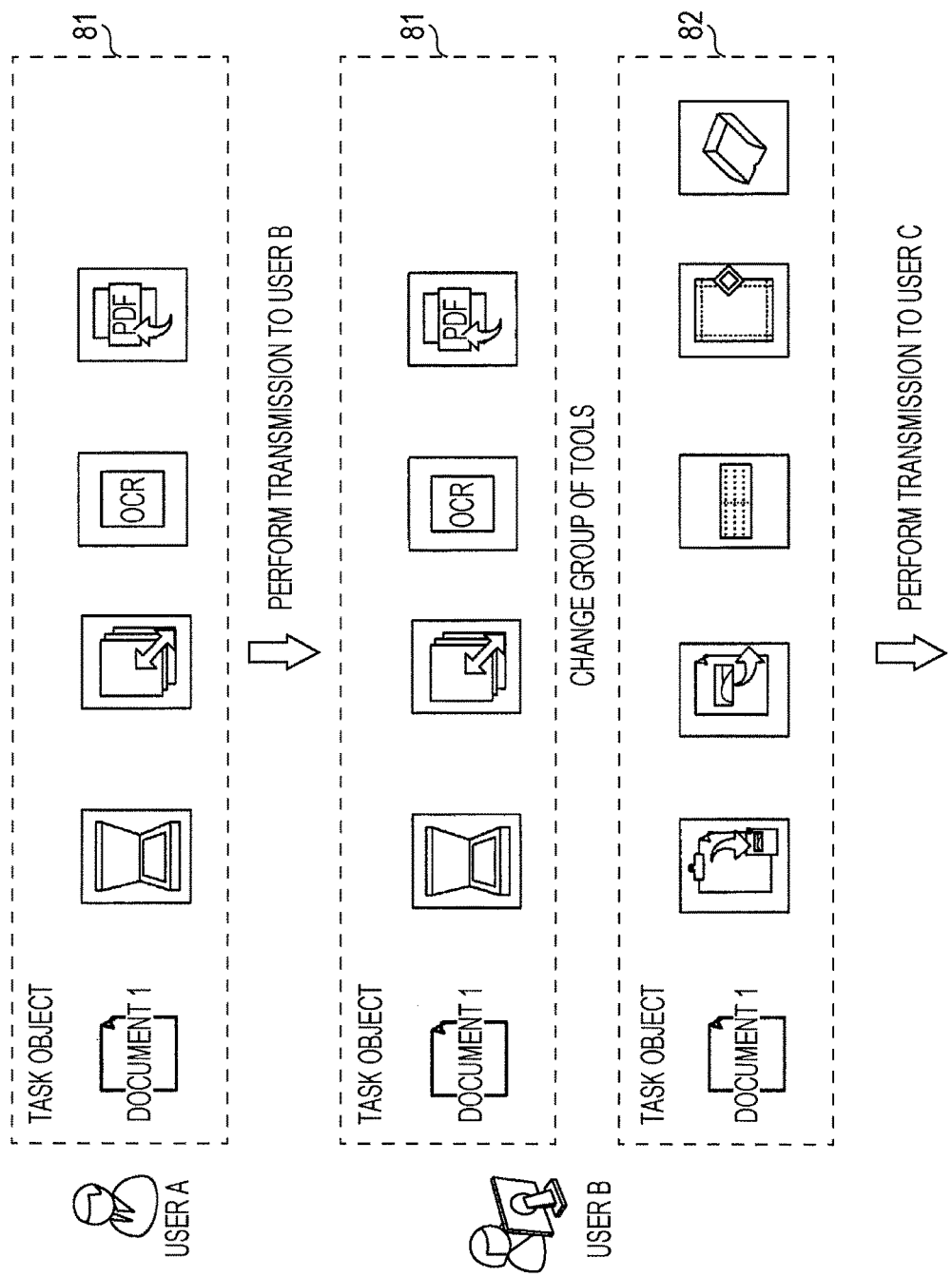
FIG. 16 is a diagram for specifically describing a case where transmission and reception of a generated task object is performed among multiple users.

For example, a case will be described where a user A generates a task object 81 as illustrated in FIG. 16 and transmits the task object 81 to an information processing apparatus of a user B.

This task object 81 is configured such that a group of tools constituted by four tools "scan start", "page sort", "OCR processing", and "PDF conversion" is associated with document data called "document 1".

The user B, who has received the task object 81 from the user A, opens the received task object 81 in the information processing apparatus of their own. As a result, a group of tools the same as the group of tools displayed in an information processing apparatus of the user A is displayed.

Here, suppose that the user B has executed, on the document data, tools displayed as the group of tools, and thus sets a new group of tools to be executed on the document 1. A new task object 82 constituted by this group of tools and the document data of the document 1 is generated in the information processing apparatus of the user B.

Figure 17:
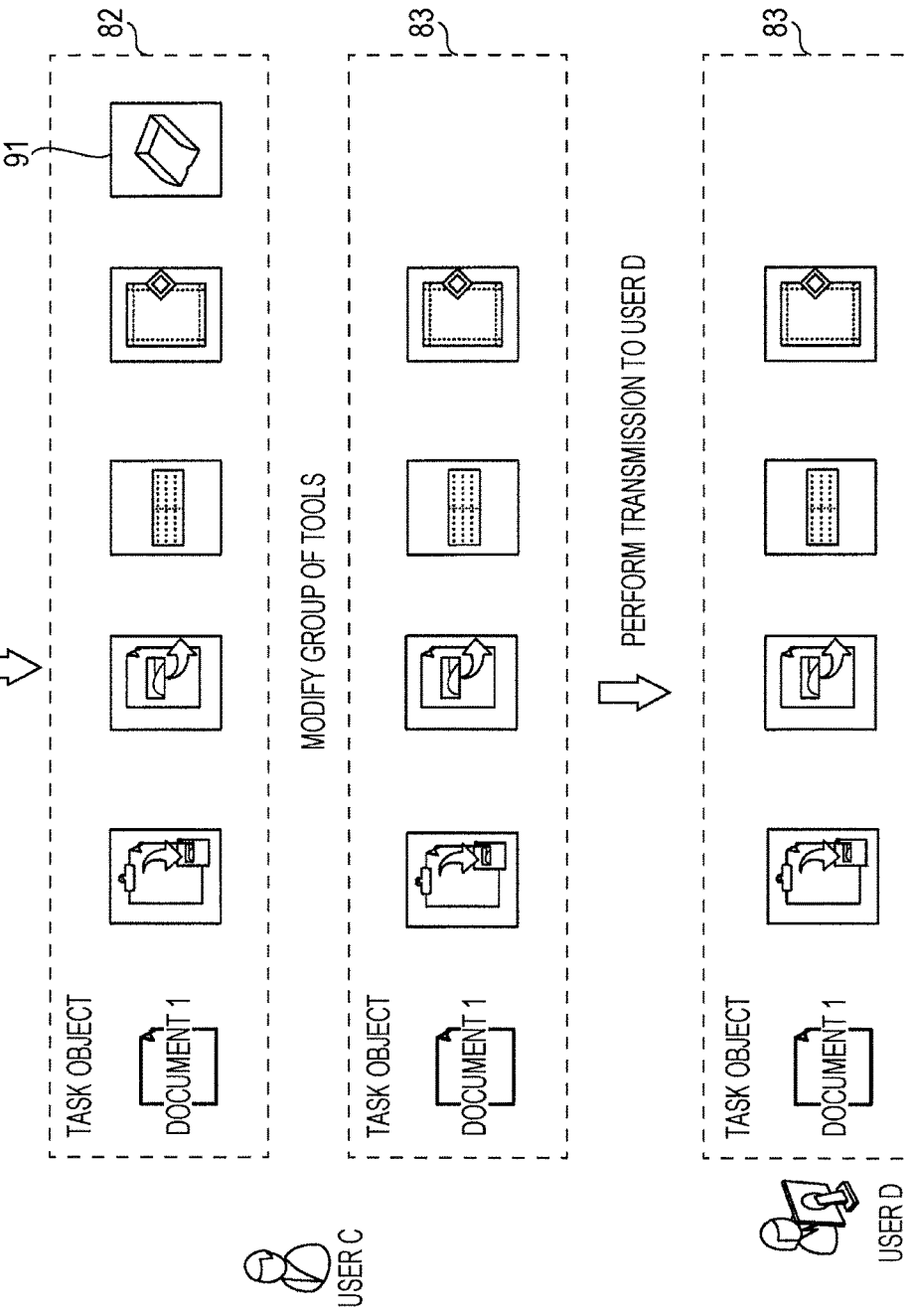
FIG. 17 is a diagram for specifically describing a case where transmission and reception of a generated task object is performed among multiple users.

Suppose that this task object 82 is transmitted from the information processing apparatus of the user B to an information processing apparatus of a user C. The task object 82 received by the information processing apparatus of the user C is opened in the information processing apparatus of the user C. As a result, as illustrated in FIG. 17, a group of tools the same as the group of tools displayed in the information processing apparatus of the user B is displayed.

Here, suppose that the user C deletes a tool 91 included in the group of tools, and generates a new task object 83 in the information processing apparatus of their own. When the task object 82 is compared with the task object 83 in FIG. 17, it is clear that the tool 91 is deleted.

The user C transmits the task object 83 to a user D, and then the task object 83 received by an information processing apparatus of the user D is opened in the information processing apparatus of the user D. As a result, a group of tools the same as the group of tools obtained after modification performed by the information processing apparatus of the user C is displayed.

Figure 18:
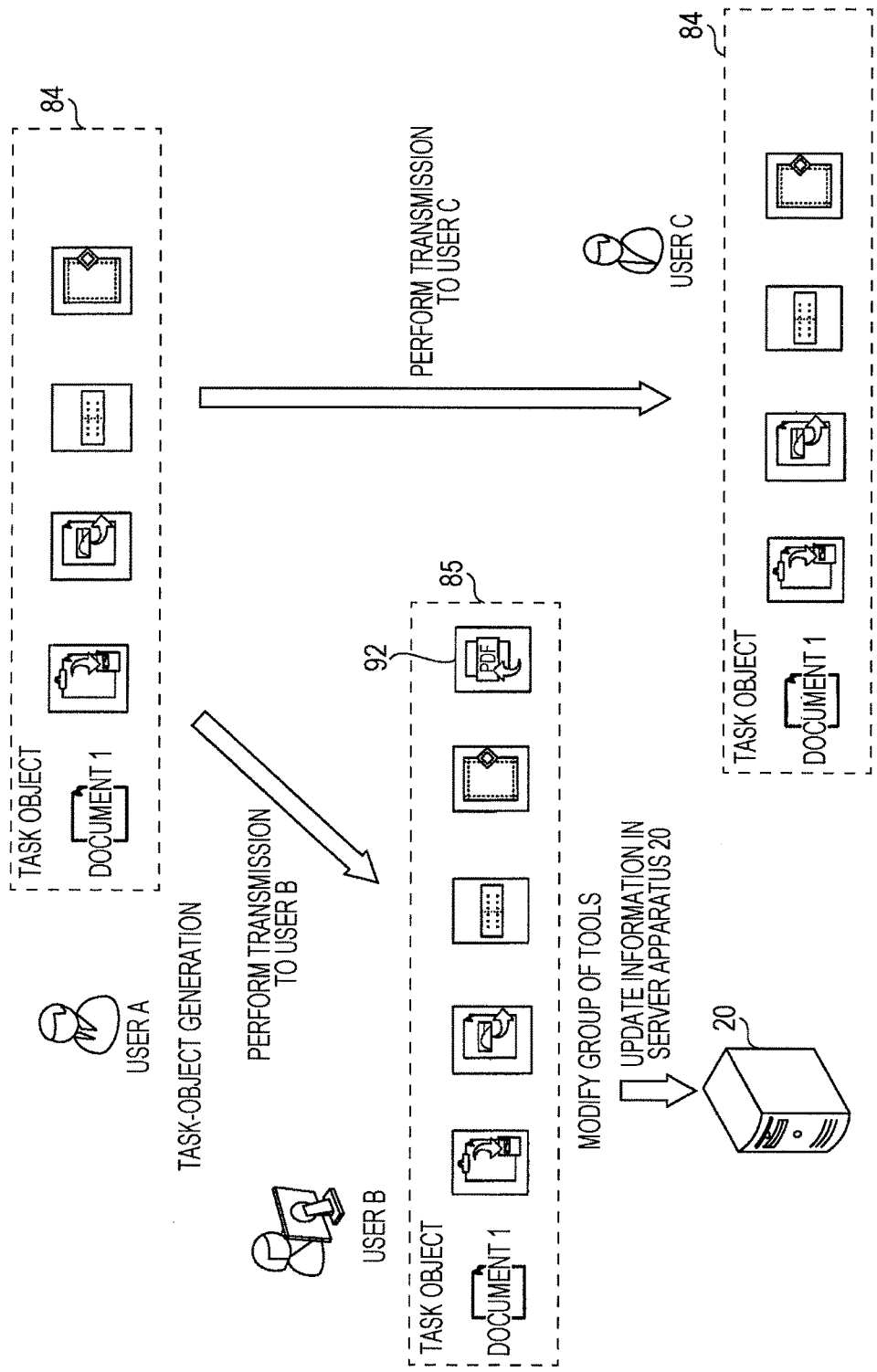
FIG. 18 is a diagram for specifically describing a case where transmission and reception of a generated task object is performed among multiple users.

In addition, FIG. 18 illustrates a case where a task object 84 generated by the user A is simultaneously transmitted to the user B and the user C.

FIG. 18 shows that the user B changes the task object 84 received from the user A into a task object 85 by adding a tool 92. Here, suppose that the user B has updated information stored in the server apparatus 20 in accordance with this changed content.

Note that the user C expands the task object 84 transmitted from the user A in the information processing apparatus of their own, and thus the task object 84 generated by the user A is displayed as is.

Here, when the user C opens the task object 84, the user C makes a selection such that the group of tools is to be updated in accordance with the information stored in the server apparatus 20. In this case, the group of tools of the expanded task object 84 is updated in accordance with the information stored in the server apparatus 20, and the task object 85 including the tool 92 added by the user B is displayed at the information processing apparatus of the user C.

In this manner the user B transmits the updated content of the group of tools to the server apparatus 20. When the user C expands the task object 84, the user C accesses the information stored in the server apparatus 20 and performs update in accordance with the latest content. As a result, the updated content of the latest group of tools is shared by multiple users.

Figure 19:
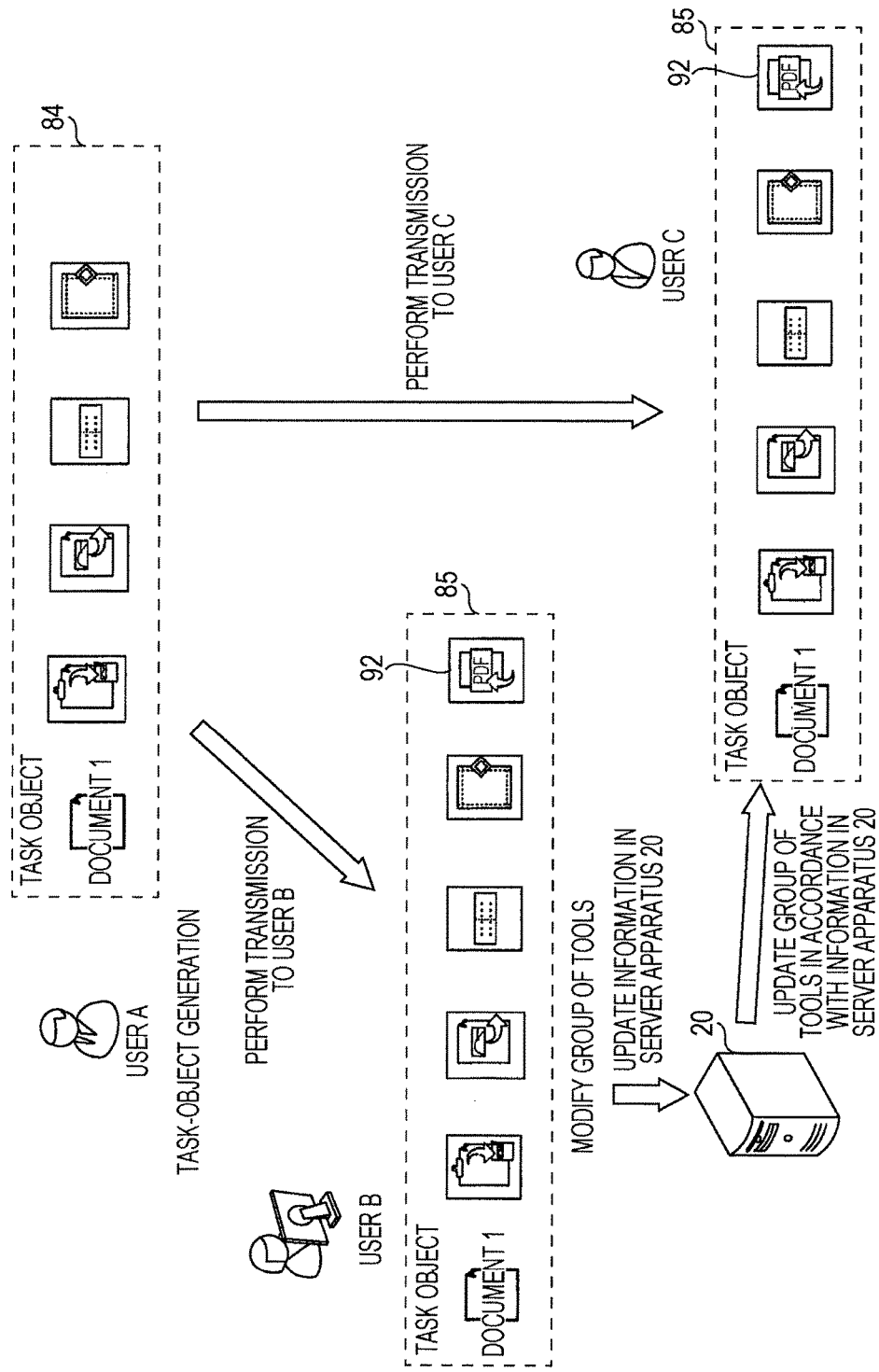
FIG. 19 is a diagram for specifically describing a case where transmission and reception of a generated task object is performed among multiple users.

Note that the user B changes the content of the group of tools and updates the information stored in the server apparatus 20 in FIG. 19; however, even when the user A changes the content of the group of tools and updates the information stored in the server apparatus 20, the updated content is shared by multiple users.

[Modification]

The exemplary embodiment is described above using a case where the present invention is applied to a document editor. However, the present invention is not limited to this, and the present invention may also be applied likewise to any software program configured to perform an edit operation on document data (a document file) and the like.

For example, the present invention is likewise applicable not only to a software program for editing document data on a personal computer but also to a software program for performing an edit operation on document data in for example a mobile information terminal apparatus such as a smartphone or a tablet terminal apparatus.

In addition, the programs executed by the information processing apparatuses in the exemplary embodiment may be stored in computer readable recording mediums and provided. Examples of the computer readable recording mediums are a magnetic recording medium (a magnetic tape, a magnetic disk (a HDD, a flexible disk (FD), or the like), an optical recording medium (an optical disc (a compact disk (CD), a digital versatile disk (DVD)) or the like), a magneto-optical recording medium, and a semiconductor memory (a flash ROM or the like). In addition, these programs may also be downloaded via a network such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
receive, from a first device different from the information processing apparatus, document data and a first group of tools associated with the document data, the first group of tools being constituted by a first plurality of processing functions indicating respective processes to be performed on the document data, the association of the document data with the first group of tools being designated by a first user using the first device;
accept a designation from a second user changing the first group of tools to a second group of tools different from the first group of tools, the second group of tools being constituted by a second plurality of processing functions indicating respective processes to be performed on the document data; and
associate the document data with the second group of tools and cause a server accessible by the first device and the information processing apparatus to store a record indicating that the document data is associated with the second group of tools.

2. The information processing apparatus according to claim 1, wherein
the processor is further programmed to:
transmit data indicating the association of the document data with the second group of tools to the server to update the record in the server regarding the association of the document data with a group of tools; and
control a display such that in a case where the document data is specified, the second group of tools is acquired from the server and displayed on the display as being associated with the document data.

3. The information processing apparatus according to claim 1, wherein
the processor displays the second group of tools associated with the document data, so that the second plurality of processing functions included in the second group of tools are individually selectable.

4. The information processing apparatus according to claim 2, wherein
the processor displays the second group of tools associated with the document data, so that the second plurality of processing functions included in the second group of tools are individually selectable.

5. The information processing apparatus according to claim 1, wherein
the second group of tools includes order information regarding an order in which the second plurality of processing functions are to be executed.

6. The information processing apparatus according to claim 2, wherein
the second group of tools includes order information regarding an order in which the second plurality of processing functions are to be executed.

7. The information processing apparatus according to claim 3, wherein
the second group of tools includes order information regarding an order in which the second plurality of processing functions are to be executed.

8. The information processing apparatus according to claim 4, wherein
the second group of tools includes order information regarding an order in which the second plurality of processing functions are to be executed.

9. The information processing apparatus according to claim 1, wherein
the association of the document data with the second group of tools is stored using a task object that associates the document data with a plurality of identifiers, each identifier identifying a respective one of the second plurality of processing functions.

10. The information processing apparatus according to claim 2, wherein
the association of the document data with the second group of tools is stored using a task object that associates the document data with a plurality of identifiers, each identifier identifying a respective one of the second plurality of processing functions.

11. The information processing apparatus according to claim 3, wherein
the association of the document data with the second group of tools is stored using a task object that associates the document data with a plurality of identifiers, each identifier identifying a respective one of the second plurality of processing functions.

12. The information processing apparatus according to claim 5, wherein
the association of the document data with the second group of tools is stored using a task object that associates the document data with a plurality of identifiers, each identifier identifying a respective one of the second plurality of processing functions.

13. The information processing apparatus according to claim 1, wherein
the processor is further programmed to:
enable a user to select either the first group of tools or the second group of tools to be displayed as being associated with the document data.

14. A non-transitory computer readable medium storing a program causing a computer to execute a process, the process comprising:
receiving, from a first device different from the computer, document data and a first group of tools associated with the document data, the first group of tools being constituted by a first plurality of processing functions indicating respective processes to be performed on the document data, the association of the document data with the first group of tools being designated by a first user using the first device;
accepting a designation from a second user changing the first group of tools to a second group of tools different from the first group of tools, the second group of tools being constituted by a second plurality of processing functions indicating respective processes to be performed on the document data; and
associating the document data with the second group of tools and causing a server accessible by the first device and the information processing apparatus to store a record indicating that the document data is associated with the second group of tools.

15. An information processing system comprising:
a first device including a first processor;
a second device including a second processor;
a third device including a third processor; and
a server,
wherein the first processor is programmed to:
accept a first input from a first user associating document data with a first group of tools, the first group of tools being constituted by a first plurality of processing functions indicating respective processes to be performed on the document data;
cause the server to store data indicating that the document data is associated with the first group of tools; and
transmit the document data associated with the first group of tools to the second device,
wherein the second processor is programmed to:
receive, from the first device, the document data associated with the first group of tools;
accept a second input from a second user changing the association of the document data to be associated with a second group of tools different from the first group of tools, the second group of tools being constituted by a second plurality of processing functions indicating respective processes to be performed on the document data; and
transmit the document data associated with the second group of tools to the third device, and
wherein the third processor is programmed to:
receive, from the second device, the document data associated with the second group of tools; and
control a display to provide an option for a third user using the third device to select either (i) the first group of tools stored in the server or (ii) the second group of tools received from the second device, to then be displayed as being associated with the document data.

* * * * *